(12) United States Patent
Wilmer et al.

(10) Patent No.: US 11,767,880 B2
(45) Date of Patent: Sep. 26, 2023

(54) ROLLER SEQUENCING FOR IMPROVED BEARING RUNOUT

(71) Applicant: The Timken Company, North Canton, OH (US)

(72) Inventors: Matthew G. Wilmer, North Canton, OH (US); Carl E. Faust, Merrimack, NH (US)

(73) Assignee: The Timken Company, North Canton, OH (US)

( * ) Notice: Subject to any disclaimer, the term of this patent is extended or adjusted under 35 U.S.C. 154(b) by 82 days.

(21) Appl. No.: 17/419,843

(22) PCT Filed: Apr. 20, 2020

(86) PCT No.: PCT/US2020/028935
§ 371 (c)(1),
(2) Date: Jun. 30, 2021

(87) PCT Pub. No.: WO2020/219374
PCT Pub. Date: Oct. 29, 2020

(65) Prior Publication Data
US 2022/0205480 A1   Jun. 30, 2022

Related U.S. Application Data (60) Provisional application No. 62/837,419, filed on Apr. 23, 2019.

(51) Int. Cl.
*F16C 19/36* (2006.01)
*F16C 43/06* (2006.01)
*F16C 23/08* (2006.01)

(52) U.S. Cl.
CPC .......... *F16C 19/362* (2013.01); *F16C 23/086* (2013.01); *F16C 43/06* (2013.01)

(58) Field of Classification Search
CPC ...... F16C 19/362; F16C 23/086; F16C 43/04; F16C 43/06
See application file for complete search history.

(56) References Cited

U.S. PATENT DOCUMENTS

| 892,416 A | 7/1908 | Gillette et al. |
|---|---|---|
| 2,040,741 A | 5/1936 | Hoke |
| (Continued) | | |

FOREIGN PATENT DOCUMENTS

| CN | 101595317 A | 12/2009 |
|---|---|---|
| CN | 104641128 A | 5/2015 |
| (Continued) | | |

OTHER PUBLICATIONS

Chinese Patent Office Action for Application No. 202080010618.X dated Jul. 14, 2022 (23 pages including English translation).

(Continued)

*Primary Examiner* — James Pilkington
(74) *Attorney, Agent, or Firm* — Michael Best & Friedrich LLP (57) ABSTRACT

A bearing includes a plurality of rolling elements (26) spaced around a three-hundred and sixty degree circumferential extent of the bearing. An odd, non-singular number of high-points are positioned as near to evenly as possible about the circumferential extent of the bearing, the high-points defined by locations at which rolling elements with the largest diameters are positioned. An odd, non-singular number of low-points are positioned as near to evenly as possible about the circumferential extent of the bearing, the low-points defined by locations at which rolling elements having the smallest diameters are positioned. The odd, non-singular number of high-points is the same as the odd, (Continued)

non-singular number of low-points, and each low-point is positioned as near to evenly as possible between two adjacent high-points.

20 Claims, 6 Drawing Sheets

(56) References Cited

U.S. PATENT DOCUMENTS

| | | | |
|---|---|---|---|
| 2,724,624 A * | 11/1955 | Barr | F16C 33/60 |
| | | | 384/492 |
| 2,796,658 A * | 6/1957 | Aller | B07C 5/06 |
| | | | 73/37.8 |
| 3,549,223 A | 12/1970 | Minick et al. | |
| 3,680,934 A | 8/1972 | Laussermair et al. | |
| 4,002,380 A | 1/1977 | Bowen | |
| 4,505,523 A * | 3/1985 | Stephan | F16C 33/543 |
| | | | 384/523 |
| 5,206,993 A * | 5/1993 | Brough | F16C 43/04 |
| | | | 384/450 |
| 7,008,113 B2 | 3/2006 | Herles et al. | |
| 7,427,163 B2 | 9/2008 | Schoder et al. | |
| 8,282,286 B2 * | 10/2012 | Kanai | F16C 19/362 |
| | | | 384/551 |
| 8,678,661 B2 | 3/2014 | Norimatsu | |
| 9,303,689 B2 | 4/2016 | Swartley et al. | |
| 9,599,151 B2 * | 3/2017 | Habibvand | F16C 19/184 |
| 10,184,517 B2 * | 1/2019 | Kajikawa | F16C 33/54 |
| 2009/0092348 A1 | 4/2009 | Ueno et al. | |
| 2010/0021101 A1 | 1/2010 | Endres et al. | |
| 2015/0192174 A1 | 7/2015 | Shimizu | |

FOREIGN PATENT DOCUMENTS

| | | |
|---|---|---|
| CN | 107405693 A | 11/2017 |
| DE | 19751693 A1 | 5/1999 |
| EP | 3269476 A1 | 1/2018 |
| GB | 149588 A | 8/1920 |
| JP | S61215480 A | 9/1986 |
| JP | H02168016 A | 6/1990 |
| JP | 2007032830 A | 2/2007 |
| JP | 2013525711 A | 6/2013 |
| JP | 2013533436 A | 8/2013 |
| JP | 2014173635 A | 9/2014 |

OTHER PUBLICATIONS

International Search Report and Written Opinion for Application No. PCT/US2020/028935 dated Sep. 8, 2020 (17 pages).
Japanese Patent Office Action for Application No. 2021-537153 dated Oct. 27, 2022 (7 pages including English translation).
Extended European Search Report for Application No. 22197311.8 dated Nov. 8, 2022 (5 pages).

* cited by examiner

ROLLER SEQUENCING FOR IMPROVED BEARING RUNOUT

RELATED APPLICATIONS

This application claims the benefit of U.S. Provisional Patent Application No. 62/837,419 filed on Apr. 23, 2019, the entire content of which is hereby incorporated by reference herein.

BACKGROUND

The present invention relates to rolling element bearings, and more specifically to crossed roller precision bearings.

Machine tools and other precision applications typically require bearings with precise runout characteristics in order to meet low error motion and runout. To achieve the required error motion and runout, it is often necessary to tighten the size tolerances on all of the bearing components. Such tolerance minimization is expensive.

SUMMARY

The present invention achieves bearings with reduced assembly error motion and runout by sequencing the as-produced rollers. Even with some size variation in the rollers, runout is minimized by the inventive sequencing.

In one aspect, the invention provides a bearing including a plurality of rolling elements spaced around a three-hundred and sixty degree circumferential extent of the bearing. An odd, non-singular number of high-points are positioned as near to evenly as possible about the circumferential extent of the bearing, the high-points defined by locations at which rolling elements with the largest diameters are positioned. An odd, non-singular number of low-points are positioned as near to evenly as possible about the circumferential extent of the bearing, the low-points defined by locations at which rolling elements having the smallest diameters are positioned. The odd, non-singular number of high-points is the same as the odd, non-singular number of low-points, and each low-point is positioned as near to evenly as possible between two adjacent high-points. Rolling elements of the plurality of rolling elements positioned between a high-point and a low-point decrease in diameter in a direction from the high-point to the low-point.

In another aspect the invention provides a method of sequencing a plurality of rolling elements around a three-hundred and sixty degree circumferential extent of a bearing. The method includes creating an odd, non-singular number of high-points as near to evenly spaced about the bearing as possible, the high-points defined by locations at which rolling elements with the largest diameters are positioned, creating the same odd, non-singular number of low-points as near to evenly spaced about the bearing as possible, with each low-point as evenly spaced between adjacent high-points as possible, the low-points defined by locations at which rolling elements having the smallest diameters are positioned, and sequencing the remaining rollers between the high-points and low-points so that the rolling elements decrease in diameter in the direction from a high-point toward a low-point.

In another aspect, the invention provides a crossed roller bearing including a plurality of tapered rollers spaced around a three-hundred and sixty degree circumferential extent of the bearing. Adjacent tapered rollers are crossed such that the respective axes of the adjacent tapered rollers are generally normal to one another. A plurality of spacers are provided, one spacer of the plurality of spacers positioned between each adjacent tapered roller. An odd, non-singular number of high-points are positioned as near to evenly as possible about the circumferential extent of the bearing, the high-points defined by locations at which tapered rollers with the largest diameters are positioned. At least one low-point is positioned as near to evenly as possible between two adjacent high-points, the low-point defined by a location at which a tapered roller having the smallest diameter is positioned. Tapered rollers of the plurality of tapered rollers positioned between a high-point and a low-point decrease in diameter in a direction from the high-point to the low-point.

In yet another aspect, the invention provides a bearing including a plurality of rolling elements spaced around a three-hundred and sixty degree circumferential extent of the bearing. An even number of high-points greater than two are positioned as near to evenly as possible about the circumferential extent of the bearing, the high-points defined by locations at which rolling elements with the largest diameters are positioned. An even number of low-points greater than two are positioned as near to evenly as possible about the circumferential extent of the bearing, the low-points defined by locations at which rolling elements having the smallest diameters are positioned. The number of high-points is the same as the number of low-points, and each low-point is positioned as near to evenly as possible between two adjacent high-points. Rolling elements of the plurality of rolling elements positioned between a high-point and a low-point decrease in diameter in a direction from the high-point to the low-point.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways and with other roller element bearing types.

Figure 1:
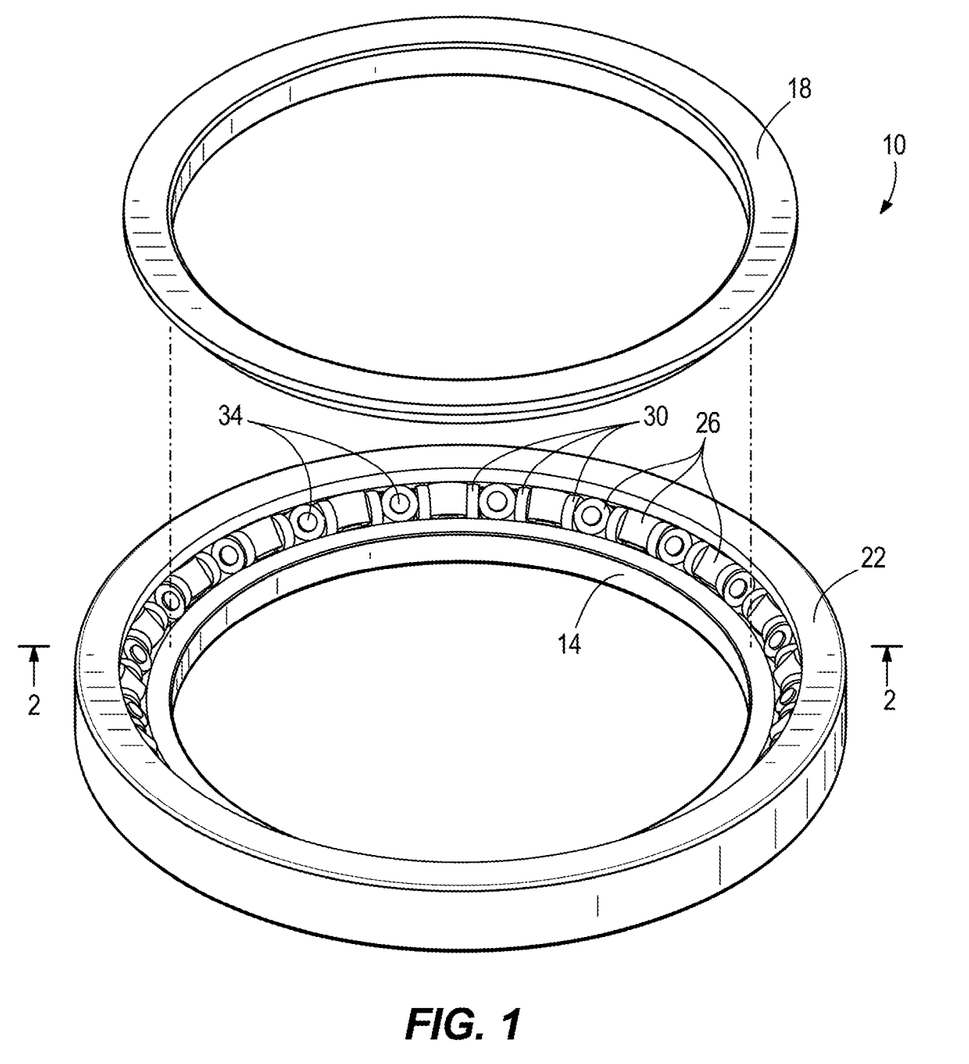
FIG. 1 is a perspective view of a crossed roller precision bearing, shown partially disassembled, embodying the present invention.
Figure 2:
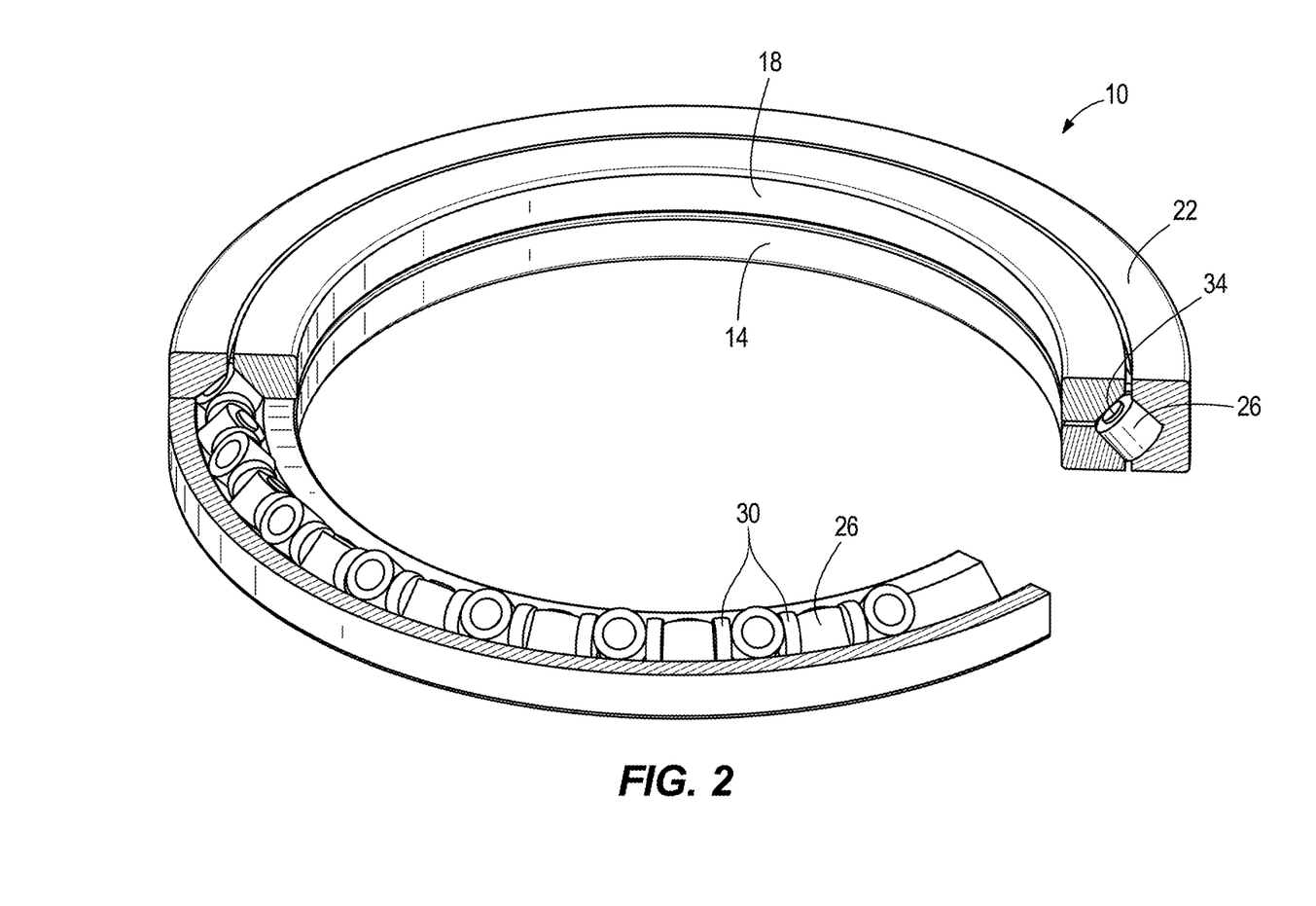
FIG. 2 is a partial section view of the assembled bearing of FIG. 1.

FIGS. 1 and 2 illustrate a rolling element bearing 10 according to the present invention. The illustrated bearing 10 is a crossed roller bearing of the type used in precision machine tools. One example is the Timken type TXRDO bearing, available from the Timken Company of North Canton, Ohio. Such bearings 10 are required to have low assembly runout so as to achieve high accuracy with the rotating machine tool. Of course, the invention can also be applied to other types of bearings.

The illustrated bearing 10 includes first and second inner rings 14, 18 and an outer ring 22. The rings 14, 18, and 22 define respective raceways on which rolling elements (e.g., tapered rollers) 26 roll. Adjacent rollers 26 are crossed, meaning that their axes of rotation are generally normal to one another, as shown. Adjacent rollers 26 are also separated from one another by spacers 30, which can be polymer (e.g., nylon) members. These crossed roller bearings do not include a cage, but instead utilize the distinct and independent spacers 30. Each roller 26 further includes a nib 34 positioned on the small-diameter end to bias the rollers 26 against the outer ring 22. The nibs 34 are also polymer members.

Rollers 26 for the bearing 10 are manufactured in batches. Despite efforts to achieve dimensional uniformity of the rollers, such as the outer diameters, manufacturing variances inevitably result in some inconsistency or variance from roller to roller. The present invention recognizes this variance in roller dimension, and incorporates it into the design and assembly process for the bearing 10.

The exemplary bearing 10 may include thirty-four rollers 26. Crossed roller bearings typically have an even number of rollers. Once manufactured, each of the thirty-four rollers 26 is measured for one or more critical dimensions. For example, with the illustrated tapered rollers 26, the diameter at the large end of the roller 26, or the maximum diameter of each roller 26, can be measured. It is also common to measure the diameter at the smaller end of the rollers, as well as a diameter at the mid-point along the roller's length (i.e., the mean diameter). It is generally understood that size variation will be consistent from roller to roller, regardless of where the diameter is measured, such that any of the three locations can be used for measurements with the method of the present invention. Regardless of which measurement is used (e.g., large end, small end, mid-point), the rollers with the largest diameter can be assigned a size factor of 1. Rollers that have a smaller diameter (due to manufacturing variance) can be assigned size factors of less than one, depending on the incremental variance below the maximum measured diameter. Thus, rollers with a next largest diameter may be assigned the size factor of 0.9, then rollers with the next largest diameter may be assigned the size factor of 0.8, and so on. Of course, various other categorizing nomenclature could be substituted (e.g., n, n–1, n–2 . . . , etc.).

Once all of the rollers 26 are measured and categorized, the sequencing of the rollers 26 within the bearing 10 can be determined. In the illustrated embodiment, the sequencing is based on providing an odd number greater than one (e.g., 3, 5, 7, etc.) of high-points or maximum diameter/largest available diameter roller locations around the 360 degrees of the bearing 10. By having a non-singular, odd number of these high-points, rocking or angular error alignment between the rings of the bearing 10 is minimized. With reference to the schematic illustration of FIG. 3, three high-points are created and those three high-points are positioned as near to equally as possible about the bearing 10 (e.g., about 120 degrees apart). If the number of rollers is not a multiple of three, it is not possible to be exactly 120 degrees apart, so the actual angle will deviate somewhat, but will be as near to 120 degrees as possible given the specific bearing 10, rollers 26, and spacers 30 used. For example, the spacing between any two high-points may range from 110 degrees to 130 degrees. Similarly, if the bearing includes five high-points, the adjacent high-points should be as near to 72 degrees as possible, and may range from 62 degrees to 82 degrees. As used herein and in the appended claims, "as near to evenly as possible" or similar phrases are intended to accommodate angular positionings that vary from a purely equal spacing due to the specific number of rollers used in the bearing, the spacers 30, and/or the variance in roller sizing that might occur within a batch of rollers to be used in the bearing. This will be further clarified and explained with the example below.

Figure 3:
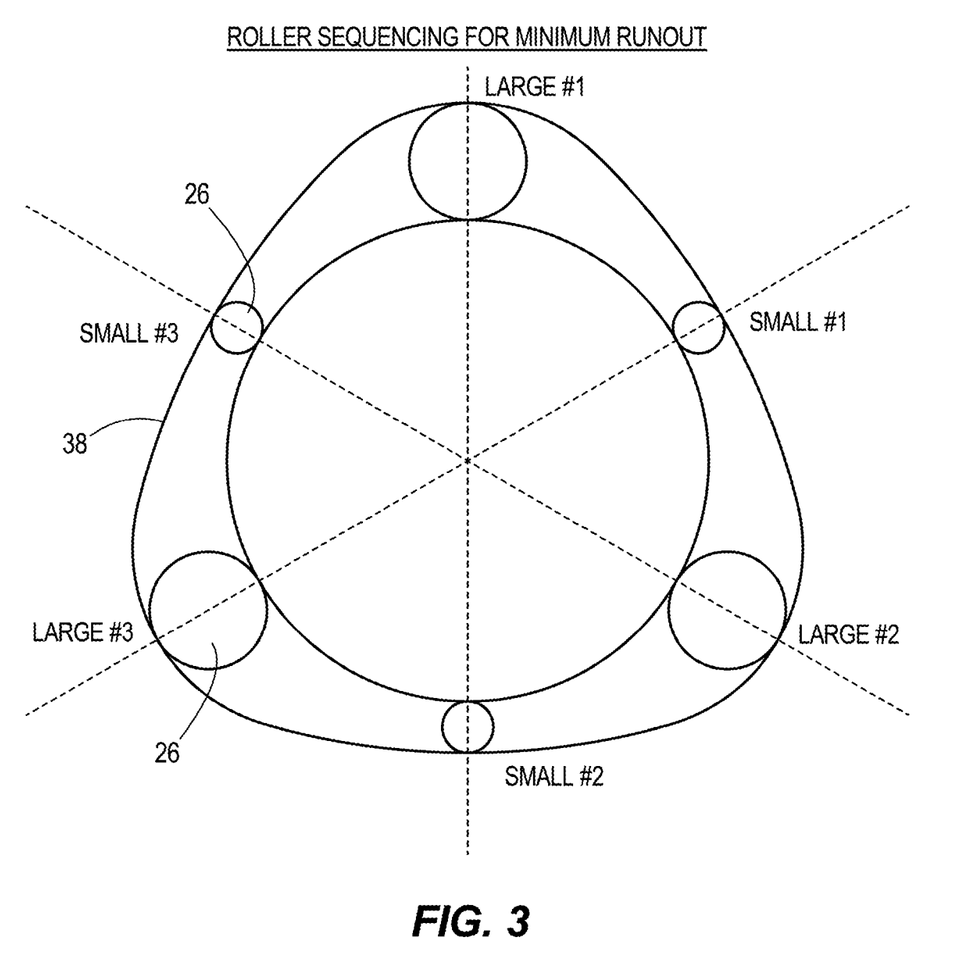
FIG. 3 is a schematic illustration of the roller sequencing of the bearing of FIG. 1.

The rollers 26 are sequentially positioned in the rings 14, 18, 22 so that if there are three rollers having a size factor of 1, those three rollers are positioned as nearly as possible to 120 degrees apart from one another. The three (or more) rollers having the smallest size factor are also positioned as nearly as possible to 120 degrees apart from one another, thereby creating three low-points or minimum diameter/smallest available diameter roller locations. These three low-points are at an angular offset of as nearly as possible to 60 degrees from the high-points created by the largest rollers. FIG. 3 schematically illustrates this placement of the largest diameter rollers and the smallest diameter rollers to achieve the three high-points and the three low-points.

The remaining rollers 26 are then sequentially positioned between the largest rollers and the smallest rollers to decrease in size from largest to smallest when positioned between one of the largest rollers and the adjacent smallest roller. This is depicted graphically by the outer line 38 in FIG. 3.

Table 1 below depicts one exemplary sequence in which roller position is determined based on the mean roller diameter.

TABLE 1

| Roller Number | Position Angle (deg) | Size Factor | Example Roller Size (mm) |
|---|---|---|---|
| 1 | 0.00 | 1 | 25 |
| 2 | 10.59 | 0.9 | 24.9995 |
| 3 | 21.18 | 0.8 | 24.999 |
| 4 | 31.76 | 0.7 | 24.9985 |
| 5 | 42.35 | 0.6 | 24.998 |
| 6 | 52.94 | 0.5 | 24.9975 |
| 7 | 63.53 | 0.5 | 24.9975 |
| 8 | 74.12 | 0.6 | 24.998 |
| 9 | 84.71 | 0.7 | 24.9985 |
| 10 | 95.29 | 0.8 | 24.999 |
| 11 | 105.88 | 0.9 | 24.9995 |
| 12 | 116.47 | 1 | 25 |
| 13 | 127.06 | 1 | 25 |
| 14 | 137.65 | 0.9 | 24.9995 |
| 15 | 148.24 | 0.8 | 24.999 |
| 16 | 158.82 | 0.7 | 24.9985 |
| 17 | 169.41 | 0.6 | 24.998 |
| 18 | 180.00 | 0.5 | 24.9975 |
| 19 | 190.59 | 0.6 | 24.998 |
| 20 | 201.18 | 0.7 | 24.9985 |
| 21 | 211.76 | 0.8 | 24.999 |
| 22 | 222.35 | 0.9 | 24.9995 |
| 23 | 232.94 | 1 | 25 |
| 24 | 243.53 | 1 | 25 |
| 25 | 254.12 | 0.9 | 24.9995 |
| 26 | 264.71 | 0.8 | 24.999 |
| 27 | 275.29 | 0.7 | 24.9985 |
| 28 | 285.88 | 0.6 | 24.998 |
| 29 | 296.47 | 0.5 | 24.9975 |
| 30 | 307.06 | 0.6 | 24.998 |
| 31 | 317.65 | 0.7 | 24.9985 |
| 32 | 328.24 | 0.8 | 24.999 |
| 33 | 338.82 | 0.9 | 24.9995 |
| 34 | 349.41 | 1 | 25 |

Thirty-four rollers are broken down into six size factors of 1 (largest), 0.9, 0.8, 0.7, 0.6, and 0.5 (smallest). Note how in this batch of thirty-four rollers, there are six size factor 1 rollers. These are the six largest rollers. Therefore, two of these largest rollers are assigned roller numbers 1 and 34 and are positioned next to one another in a pair, with the three pairs of the largest rollers spaced apart from one another by as near to 120 degrees as possible (see roller numbers 1, 34; 12, 13; and 23, 24 and their associated angular positions). Note the spacing between roller 1 and roller 12 is 116.47 degrees, the spacing between roller 12 and roller 24 is 127.06 degrees, and the spacing between roller 24 and roller 1 is 116.47 degrees. It can therefore be seen how the pairs of rollers defining each of the three high-points are generally about 120 degrees apart from one another, and are as evenly spaced about the circumference of the bearing as possible, given the number rollers, their respective size variations, and the spacers 30. One of ordinary skill in the art of bearing design, implementing this inventive sequencing, would be able to determine the appropriate "as near to evenly as possible" spacing of the high-points and low-points for any particular bearing based on the number of rollers and the size factor categorization determined after measurements are taken. Instead of determining the positioning based on the location of one roller defining each high-point, another possible method would be to position the center of each high-point (the mid-point between two or three rollers defining each high-point) as close to 120 degrees apart as possible.

In the case in which high-points are defined by a pair of rollers, the paired high-point rollers ride on alternating races because adjacent rollers are crossed (i.e., their axes are generally normal to one another). With this arrangement, both radial and axial runout are reduced. Thus, where it is possible to create high-points using pairs of adjacent rollers, improved runout reduction can be achieved on crossed roller bearings.

Note also how in this batch of thirty-four rollers, there are four size factor 0.5 rollers. These are the four smallest rollers. Roller numbers 6 and 7 are positioned adjacent one another in a pair, while the two remaining smallest rollers are assigned roller numbers 18 and 29 and are spaced apart by as near to 120 degrees as possible. These smallest rollers are spaced apart from the closest largest roller by as near to 60 degrees as possible. Once again, the same considerations based on the number of rollers, size variation, etc. apply, as described above.

Figure 4:
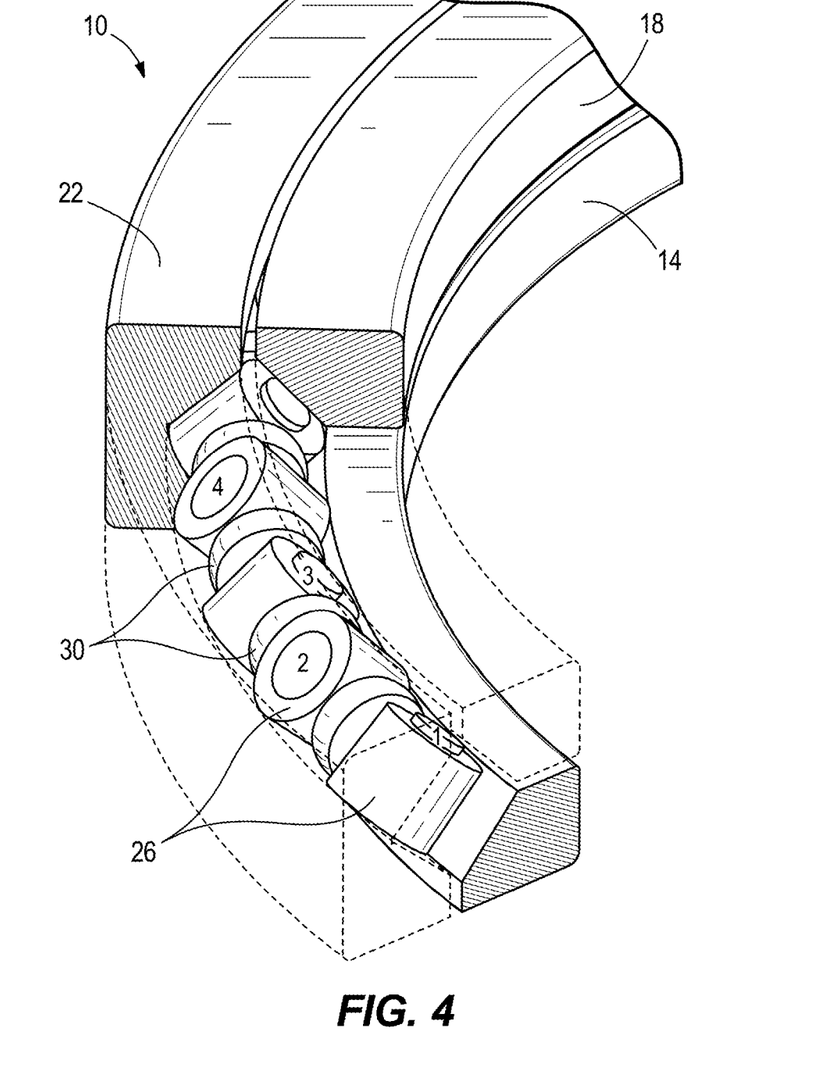
FIG. 4 is a partial assembled view, with portions of the inner ring and outer ring removed, illustrating the roller sequencing of the bearing of FIG. 1.

The remaining rollers, which are assigned size factors 0.9, 0.8, 0.7, and 0.6, are positioned as set forth in the table to decrease in size from the largest rollers to the smallest rollers. FIG. 4 illustrates a portion of the assembled bearing 10 with roller numbers 1-4 shown. Again, due to the even number of rollers, and due to the specific breakdown of size factors for any batch of rollers, the number of rollers between the largest rollers and the adjacent smallest roller will not necessarily be the same.

For highest precision, and as shown in FIGS. 1 and 2, all rollers are in preload to the bearing races at nominal assembly and in operation of the bearing. The larger rollers have slightly higher preload than the smaller rollers, but all rollers are continually in contact with the inner and outer raceways. The gradual transition of roller sizes in the described sequencing provides more uniform contact pressure with adjacent rollers enhancing the dynamic stability of the bearing assembly.

The invention therefore includes a method of (1) creating an odd, non-singular number of high-points or nodes as near to evenly-spaced about the bearing as possible, (2) creating the same odd number of low-points or nodes as near to evenly-spaced about the bearing as possible, with each low-point as evenly spaced between adjacent high-points as possible, and (3) sequencing the remaining rollers between the high-points and low-points so as to incrementally get smaller in the direction from a high-point toward a low-point.

To the extent that the bearing 10 is provided in a disassembled state to be assembled on location and/or by an end user, the rollers 26 can be clearly numbered and the disassembled bearing can be packaged with instructions for installing the rollers in the proper sequence to ensure that the minimized assembly runout of the bearing 10 is achieved. For example, the rollers 26 might be numbered sequentially to be installed in numerical order, as is the case with the rollers listed in Table 1. Alternatively, if the rollers are numbered as they are measured, a chart or listing of where each roller number should be located in the bearing may be provided.

The invention also contemplates other variations in roller sequencing, as would be dictated by the specific batch of rollers provided for each bearing. For example, in some embodiments, an odd, non-singular number of high-points may be created in the same manner set forth above. However, it is possible that the number of smallest diameter rollers does not match the number of high-points, and therefore, the number of true lowest points may technically be one, two, or some other number that is less than and not the same as the number of high-points.

For example, in one embodiment, there may be only a single roller that is the smallest diameter roller upon measurement of the batch of rollers to be used in the bearing. In that case, the smallest diameter roller can be spaced as evenly as possible between two adjacent high-points. While that single smallest roller would technically define a single low-point on the bearing, the same concept described above for sequencing the remaining rollers would be used. If three high-points were present, with the single smallest roller representing a low-point spaced as evenly as possible between two adjacent high-points, the next smallest diameter roller would be spaced as evenly as possible between two different adjacent high-points, and another of the next smallest diameter roller could be spaced as evenly as possible between the last two different adjacent high-points. With reference to FIG. 3, in this example, the low-point defined by the smallest single roller could be the roller labeled SMALL #1. The rollers labeled SMALL #2 and SMALL #3 may be slightly larger rollers than the smallest diameter roller, but are still the next smallest diameter rollers, such that the roller sequencing follows the same pattern described above with the example based on Table 1. Namely, with three high-points spaced as shown in FIG. 3, the rollers are sequenced in the large-to-small-to-large repeated sequence represented schematically in FIG. 3.

The same situation could occur where only a single largest diameter roller is present in the batch of rollers. In that case, while there would technically be only a single highest point, the next largest rollers would be used to create the desired total number of high-points. Therefore, it should be understood that the term high-point may include both the highest point on the bearing as determined by the largest diameter rollers, but may also include a location in which a roller that is the next-to-largest diameter is used because there are not enough of the largest-diameter rollers available in the batch of rollers to create the desired number of high-points. Similarly, it should be understood that the term low-point may include both the lowest point on the bearing as determined by the smallest diameter rollers, but may also include a location in which a roller that is the next-to-smallest diameter is used because there are not enough of the smallest-diameter rollers available in the batch of rollers to create the desired number of low-points.

Those of skill in the art of bearing design will therefore understand that for each batch of rollers, it may not be possible to have a desired number of identical high-points or a desired number of identical low-points, to achieve a perfectly matched number of high-points and low-points. However, the inventive concept of creating an odd, non-singular number of high-points spaced as evenly as possible around the bearing, and sequencing the remaining rollers between those high-points to have the smallest rollers spaced as low-points as evenly as possible between the high-points, with remaining rollers decreasing in size from the high-points to those low-points, is the inventive concept that has been found to reduce assembly runout.

Furthermore, as used herein and in the appended claims, the phrase decrease in diameter in a direction from the high-point to the low-point, as it refers to the rollers positioned between adjacent high and low points, contemplates the situation in which two adjacent rollers between the high and low points might be of the same diameter. In this case, there may not be a decrease in diameter with every roller in the sequence (i.e., from one roller to the next). However, the trend from the high point to the adjacent low point is a decrease in diameter, with no intervening increase in diameters.

Figure 5:
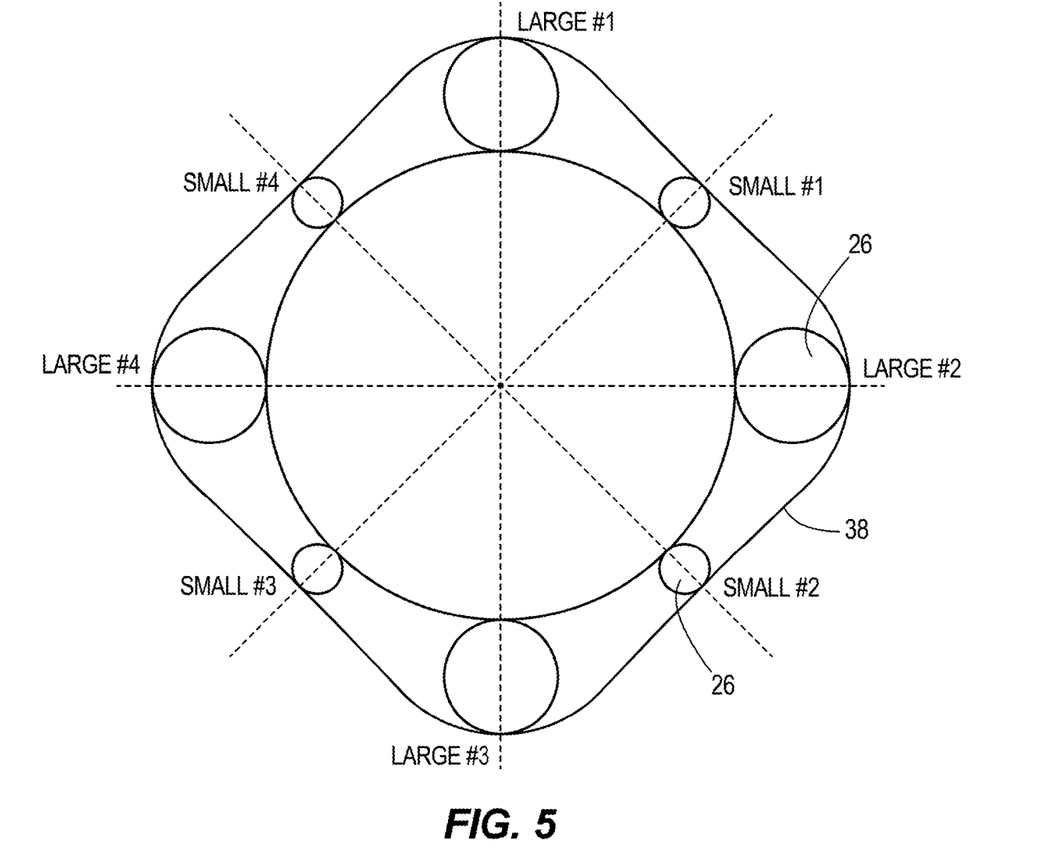
FIG. 5 is a schematic illustration of an alternative roller sequencing arrangement embodying the invention.

Ideally the high and the low points are positioned approximately 180 degrees from one another. An odd, nonsingular sequence is optimum, but even using an even sequence of greater than two high-points (e.g. 4, 6, 8, etc.) will provide some benefit in the reduction of error motion and runout if properly sequenced apart from one another with the high-points evenly distributed around the 360 degree circumference and the low-points positioned evenly between them. FIG. 5 schematically illustrates one such arrangement with four high-points and four low-points. With the arrangement shown in FIG. 5, the inventive concept includes creating an even number of high-points, greater than two, spaced as evenly as possible around the bearing, and sequencing the remaining rollers between those high-points to have the smallest rollers spaced as low-points as evenly as possible between the high-points, with remaining rollers decreasing in size from the high-points to those low-points.

Sequencing the rollers around the circumference has been illustrated for a cross roller bearing. Other bearing types can also benefit from this type of sequencing. For example if a single row bearing such as a TS (Taper Single) bearing needs improved runout characteristics, the rollers cans be sequenced in a similar manner. This is also applicable to other bearing types such as ball, angular contact ball, spherical, and cylindrical roller bearings. Other bearing combinations sequenced in a similar manner can have improved runout. These would include taper cross roller bearings, cylindrical cross roller bearings, four point ball bearings, taper double outer race bearings, taper double inner race bearings and deep groove ball bearings. In these types of bearings each bearing row has the rollers sequenced as stated previously.

Figure 6:
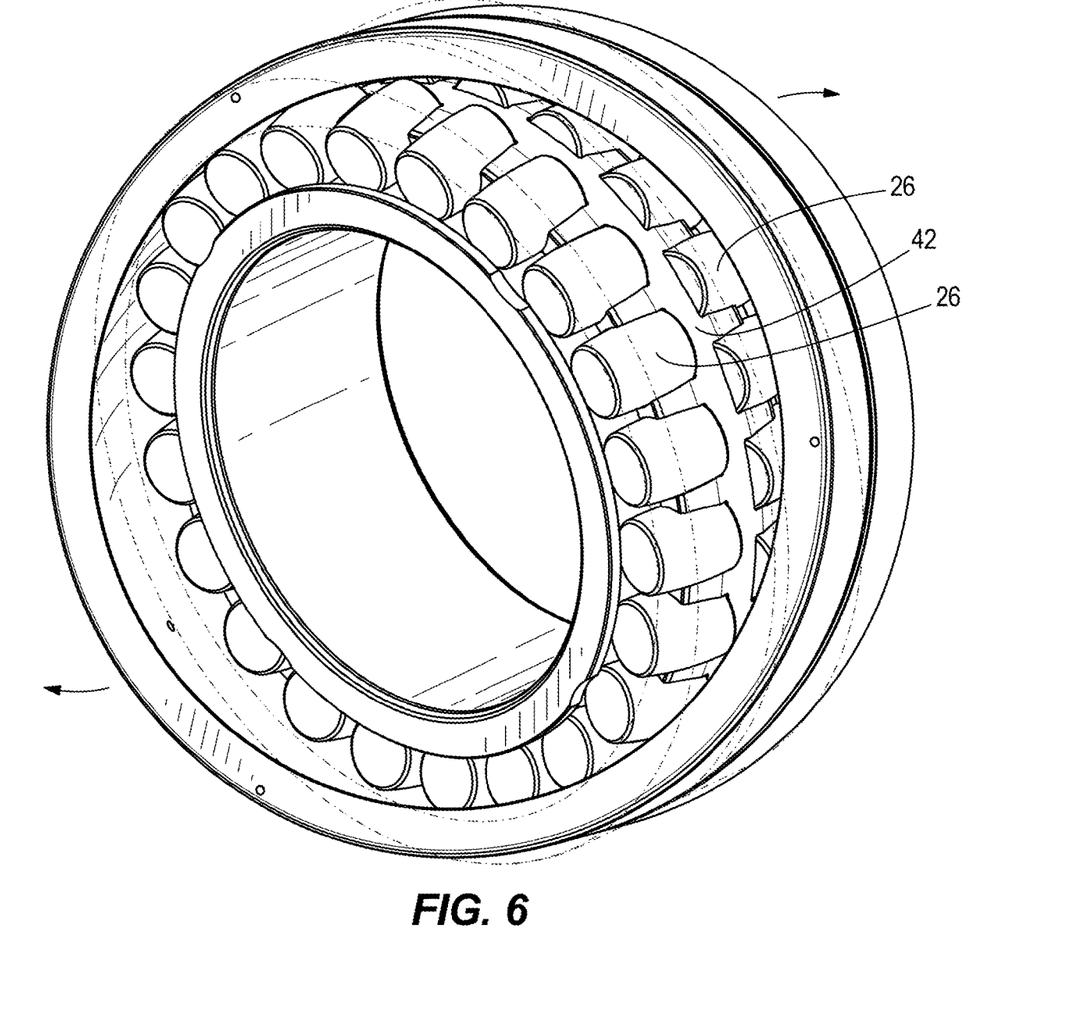
FIG. 6 is a perspective view of two row spherical roller bearing embodying the present invention.

If a multi-row (e.g., two row) bearing arrangement needs reduced runout, the rollers around each row can be sequenced as described above, and as shown in FIG. 6, can be retained by a cage 42 to keep the high-points and low-points of one row aligned with the high-points and low-points in the adjacent row(s).

Various features of the invention are set forth in the following claims.

What is claimed is:

1. A bearing comprising:
a plurality of rolling elements spaced around a three-hundred and sixty degree circumferential extent of the bearing;
(A) an odd, non-singular number of high-points positioned as near to evenly as possible about the circumferential extent of the bearing, the high-points defined by locations at which rolling elements with the largest diameters are positioned;
an odd, non-singular number of low-points positioned as near to evenly as possible about the circumferential extent of the bearing, the low-points defined by locations at which rolling elements having the smallest diameters are positioned;
wherein the odd, non-singular number of high-points is the same as the odd, non-singular number of low-points; or
(B) an even number of high-points greater than two positioned as near to evenly as possible about the circumferential extent of the bearing, the high-points defined by locations at which rolling elements with the largest diameters are positioned;
an even number of low-points greater than two positioned as near to evenly as possible about the circumferential extent of the bearing, the low-points defined by locations at which rolling elements having the smallest diameters are positioned;
wherein the even number of high-points is the same as the even number of low-points;
wherein each low-point is positioned as near to evenly as possible between two adjacent high-points;
wherein rolling elements of the plurality of rolling elements positioned between a high-point and a low-point decrease in diameter in a direction from the high-point to the low-point; and
wherein the bearing is a multi-row bearing assembly having a cage that aligns the high-points and low-points of one row of rolling elements with the high-points and low-points in an adjacent row of rolling elements, the cage being configured such that alignment includes a circumferential offset between rotational axes of the rolling elements in the one row and rotational axes of the rolling elements in the adjacent row.

2. The bearing of claim 1, wherein the odd, non-singular number of high-points and low-points is three.

3. The bearing of claim 2, wherein each high-point is spaced as close to 120 degrees from an adjacent high-point as possible, depending on a total number of rolling elements in the bearing.

4. The bearing of claim 3, wherein each low-point is spaced as close to 60 degrees from an adjacent high-point as possible, depending on a total number of rolling elements in the bearing.

5. The bearing of claim 1, wherein the high-points are all defined by rolling elements having a same diameter that is a largest measured diameter of the rolling elements in the bearing.

6. The bearing of claim 1, wherein the low-points are all defined by rolling elements having a same diameter that is a smallest measured diameter of the rolling elements in the bearing.

7. The bearing of claim 1, wherein the high-points are all defined by rolling elements of largest measured diameters of the rolling elements in the bearing, those largest measured diameters being different diameters.

8. The bearing of claim 1, wherein the low-points are all defined by rolling elements of smallest measured diameters of the rolling elements in the bearing, those smallest measured diameters being different diameters.

9. The bearing of claim 1, wherein the bearing is one of a ball bearing, an angular contact ball bearing, a spherical bearing, a cylindrical roller bearing, a four point ball bearing, a taper double outer race bearing, a taper double inner race bearings and deep groove ball bearings.

10. The bearing of claim 1, wherein the rolling elements are in preload such that all rolling elements are in contact with inner and outer raceways of the bearing.

11. The bearing of claim 1, wherein the even number of high-points and low points greater than two is four.

12. A crossed roller bearing comprising:
   a plurality of rollers spaced around a three-hundred and sixty degree circumferential extent of the bearing, adjacent rollers being crossed such that the respective axes of the adjacent rollers are generally normal to one another;
   a plurality of spacers, one spacer of the plurality of spacers positioned between each adjacent roller;
   (A) an odd, non-singular number of high-points positioned as near to evenly as possible about the circumferential extent of the bearing, the high-points defined by locations at which rollers with the largest diameters are positioned;
   an odd, non-singular number of low-points positioned as near to evenly as possible about the circumferential extent of the bearing, the low-points defined by locations at which rollers having the smallest diameters are positioned;
   wherein the odd, non-singular number of high-points is the same as the odd, non-singular number of low-points; or
   (B) an even number of high-points greater than two positioned as near to evenly as possible about the circumferential extent of the bearing, the high-points defined by locations at which rollers with the largest diameters are positioned;
   an even number of low-points greater than two positioned as near to evenly as possible about the circumferential extent of the bearing, the low-points defined by locations at which rollers having the smallest diameters are positioned;
   wherein the even number of high-points is the same as the even number of low-points;
   wherein each low-point is positioned as near to evenly as possible between two adjacent high-points;
   wherein rollers of the plurality of rollers positioned between a high-point and a low-point decrease in diameter in a direction from the high-point to the low-point; and
   wherein each high-point is defined by a pair of rollers that ride on alternating races of the crossed roller bearing.

13. The crossed roller bearing of claim 12, wherein no cage is present in the bearing.

14. The crossed roller bearing of claim 12, wherein the bearing includes two inner rings and one outer ring.

15. The crossed roller bearing of claim 14, wherein each roller includes a nib adjacent a smaller diameter end that biases the roller toward the outer ring.

16. The crossed roller bearing of claim 12, wherein the odd, non-singular number of high-points and low-points is three.

17. The crossed roller bearing of claim 12, wherein the odd, non-singular number of high-points and low-points is five.

18. The crossed roller bearing of claim 12, wherein the rollers are in preload such that all rollers are in contact with inner and outer raceways of the bearing.

19. The crossed roller bearing of claim 12, wherein the rollers are tapered rollers or cylindrical rollers.

20. The crossed roller bearing of claim 12, wherein the even number of high-points and low points greater than two is four.

* * * * *